United States Patent [19]
Wong et al.

[11] Patent Number: 6,128,613
[45] Date of Patent: Oct. 3, 2000

[54] METHOD AND APPARATUS FOR ESTABLISHING TOPIC WORD CLASSES BASED ON AN ENTROPY COST FUNCTION TO RETRIEVE DOCUMENTS REPRESENTED BY THE TOPIC WORDS

[75] Inventors: Wing S. Wong; An Qin, both of Shatin, China

[73] Assignee: The Chinese University of Hong Kong, Hong Kong, The Hong Kong Special Administrative Region of the People's Republic of China

[21] Appl. No.: 09/069,618

[22] Filed: Apr. 29, 1998

Related U.S. Application Data

[60] Provisional application No. 60/050,818, Jun. 26, 1997.

[51] Int. Cl.$^7$ .................................................. G06F 17/30
[52] U.S. Cl. ................................. 707/7; 707/5; 707/532
[58] Field of Search .................................. 707/7, 5, 532

[56] References Cited

U.S. PATENT DOCUMENTS

| | | | |
|---|---|---|---|
| 5,020,019 | 5/1991 | Ogawa | 175/85 |
| 5,297,042 | 3/1994 | Morita | 707/5 |
| 5,418,948 | 5/1995 | Turtle | 707/4 |
| 5,488,725 | 1/1996 | Turtle et al. | 707/5 |
| 5,544,352 | 8/1996 | Egger | 707/5 |
| 5,619,709 | 4/1997 | Caid et al. | 707/532 |
| 5,765,150 | 6/1998 | Burrows | 707/5 |
| 5,905,980 | 5/1999 | Masuichi et al. | 707/1 |
| 5,920,854 | 7/1999 | Kirsch et al. | 707/3 |

OTHER PUBLICATIONS

Unger, E.A. et al. ("Entropy as a Measure of Database Information", IEEE, 1990, pp. 80–87).

*Primary Examiner*—Thomas G. Black
*Assistant Examiner*—William Trinh
*Attorney, Agent, or Firm*—Townsend and Townsend and Crew LLP; Kenneth R. Allen

[57] ABSTRACT

A computer-based method and system for establishing topic words to represent a document, the topic words being suitable for use in document retrieval. The method includes determining document keywords from the document; classifying each of the document keywords into one of a plurality of preestablished keyword classes; and selecting words as the topic words, each selected word from a different one of the preestablished keyword classes, to minimize a cost function on proposed topic words. The cost function may be a metric of dissimilarity, such as cross-entropy, between a first distribution of likelihood of appearance by the plurality of document keywords in a typical document and a second distribution of likelihood of appearance by the plurality of document keywords in a typical document, the second distribution being approximated using proposed topic words. The cost function can be a basis for sorting the priority of the documents.

23 Claims, 6 Drawing Sheets

METHOD AND APPARATUS FOR ESTABLISHING TOPIC WORD CLASSES BASED ON AN ENTROPY COST FUNCTION TO RETRIEVE DOCUMENTS REPRESENTED BY THE TOPIC WORDS

CROSS-REFERENCE TO RELATED APPLICATIONS

This application claims priority from the following U.S. Provisional Application, the disclosure of which, including any appendices or attachments, is incorporated by reference in its entirety for all purposes:

U.S. Provisional Patent Application Ser. No. 60/050,818, in the name of Wing S. Wong and An Qin, entitled, "INFORMATION RETRIEVAL MODEL BASED ON BAYESIAN NETWORK", filed Jun. 26, 1997.

BACKGROUND OF THE INVENTION

The present invention relates to computer databases. More particularly, the present invention relates to the indexing and retrieval of information from computer databases.

FIG. 1 shows a system 100 and its environment for indexing and retrieving information from a database 105. FIG. 1 is a high-level diagram and is labelled "prior art." However, if selected modules within FIG. 1 are implemented according to the present invention, FIG. 1 would not be prior art.

According to FIG. 1, an indexing engine 101 uses documents 103 from a database 105 to determine an index structure 107. A retrieval engine 109 accepts a query 111 from a user via a user interface and uses the index structure 107 to determine the identity or identities 115 of one or more documents from the database 105 that are responsive to the query 111. As indicated by dashed lines, the identities 115 of documents may include links 117 to the databases for producing the identified documents 119 to the user 113. Either the identities 115 of the documents or some or all of the documents 119 may be considered to be the output of the retrieval engine 109, depending on the particular implementation.

Databases

A database is a collection of information. A database can be viewed as a collection of records, or documents. Thus, a database is also referred to as a document database or a database of documents.

A query as used herein is an expression of a user's need for information from the database or about the database. Given a query, a document retrieval system attempts to identify and/or provide one or more documents from the database responsive to the query. Generally, this means that the document retrieval system will navigate or search through an index structure to find document(s) relevant to the query.

An index structure is any type of data structure with information about the contents of documents in the database. The documents of a database may themselves constitute an index structure for the database.

An example of a computer database is an electronically-readable library of files containing, e.g., text, graphics, audio, and/or video, etc. Each file in the library is a document in the database.

A specific example of a computer database is the Internet or the portion of the Internet called the World Wide Web ("the Web"). On the Web, every file or service or Web page which can be accessed can be referred to as a document. The Web can be thought of as a globe-spanning, fast-growing collection, or database, of millions of linked documents. These documents are created and added to the Web by individuals and individual organizations with virtually no rules or restrictions as to content or organization of information. Consequently, the task of locating relevant information on the Web is a difficult one.

As computer databases, e.g., the Web, proliferate, there is a growing need for powerful, efficient, and versatile document indexing and retrieval methods and systems.

Indexing

Document indexing refers to the creation of an index structure for a database for use during retrieval. One approach to document indexing is simply to let the documents themselves be the index structure, so that the documents themselves can be searched (e.g., text-searched) during retrieval. This approach has the advantage of being simple. However, this approach is grossly inefficient for even moderately large databases.

Another approach to document indexing is to form an inverted file of words that appear in the database with pointers for each such word to the document(s) which contain the word. During retrieval, the document retrieval system searches the index for words of interest and identifies and/or provides the document(s) which contain them.

Optionally, an index structure such as an inverted file index structure may omit words, e.g., "the" or "and," that are unlikely to be useful as retrieval keywords. Such words omitted from an index structure are well-known and are commonly referred to as "stop words."

Inverted-file index structures can be automatically generated and are adequate for many purposes. However, the storage and computational requirements for storing and processing such index structures are typically quite substantial for large databases because of the need to index all or substantially all (non-stop) words found in the database.

Yet another approach to document indexing is to have human workers categorize documents to produce index structures such as hierarchical directories. While this approach is useful and appropriate for certain document retrieval purposes, it is labor-intensive and not practical for indexing large databases such as the Web.

Retrieval

Document retrieval refers to the identifying or providing of one or more documents from a database responsive to a query. One common type of query includes a list of retrieval keywords. Because document retrieval typically involves some type of search, it is sometimes referred to as document search.

Document retrieval schemes are typically evaluated using two scores, Recall and Precision. Recall typically refers to the proportion of relevant documents in a database that are successfully retrieved. For example, if ten documents in a database of 10,000 documents are relevant to a user's information need, and a document retrieval scheme successfully retrieves six of these ten documents, then the Recall is sixty percent.

Precision typically refers to the proportion of retrieved documents that are actually relevant. For example, if a document retrieval scheme retrieves fifty documents, but only six of them are relevant to a user's information need, then the Precision is twelve percent.

One approach to document retrieval is Boolean search of an index structure. Under this approach, a user may use operators such as AND, OR, and NOT with retrieval keywords in a query. A drawback of this approach is that it typically requires a large index structure, such as the inverted file. Another drawback is that, while this approach typically produces high Recall, it also produces low Precision.

Refinements to the Boolean search exist. Typically, these refinements attempt to improve Recall and/or Precision. Refinements of the Boolean search include vector-based search and automatic query expansion.

With vector-based search, a retrieval engine considers for each retrieved document the frequency of appearance of each retrieval keyword in the document relative to the frequency of appearance of the keyword in all documents in the database. The relative frequencies of appearance for each retrieved document define a point (i.e., vector) in a vector space having dimensional axes that each correspond to one of the retrieval keywords in the query. Similar documents tend to cluster near each other in the vector space. Using this geometric relationship, the user can more efficiently examine retrieved documents. A drawback of vector-based search is that, while it can improve Precision, it cannot improve Recall. Another drawback with vector-based search is that it continues to require large index structures.

With automatic query expansion, a retrieval engine automatically adds new keywords to a user's query based on a predefined thesaurus or a predefined word co-occurrence list. A drawback with this refinement is that, while it can improve Recall, it typically worsens Precision. Furthermore, building a thesaurus of terms can be a very difficult manual task.

In light of the above discussion, it is seen that there is a need for improved indexing and retrieval of documents for computer document databases. In particular, methods and systems are needed which require reduced storage for index structures and improve Recall and Precision even when applied to large databases such as the Internet or the Web.

REFERENCES

The following references are useful for further study as background on the subject matter of the present invention:

Chow, C. K. and Liu, C. N., "Approximating Discrete Probability Distributions with Dependence Trees", IEEE Trans. on Information Theory, Vol. 1T-14, No. 3, May 1968.

Jensen, F. V., "An Introduction to Bayesian Networks" UCL Press, 1996.

Pearl, J., "Fusion, Propagation, and Structuring in Belief Networks", Artificial Intelligence, Vol. 29, pp. 241–288, 1986.

SUMMARY OF THE INVENTION

According to the present invention, a system and computer-based method provide document indexing and ordered retrieval by establishing topic words to represent each document, wherein the topic words are used for sorting suitable for a computer database index structure.

In a particular embodiment, topic word selection is optimized by application of Bayesian theory. The method includes the steps of accepting at least a portion of the document from a data input device; determining document keywords from that portion of the document; classifying each of the document keywords into one of a plurality of preestablished keyword classes; and selecting words or word sequences called topic threads as the topic words, each selected word from a different one of the preestablished keyword classes, to minimize a cost function on proposed topic words.

In a specific embodiment of the invention, the cost function is a metric of dissimilarity between a first distribution of likelihood of appearance by the plurality of document keywords in a typical document and a second distribution of likelihood of appearance by the plurality of document keywords in a typical document, the second distribution being approximated using proposed topic words.

In a further specific embodiment of the invention, the metric of dissimilarity used is cross-entropy.

For search and retrieval tasks, an embodiment of the present invention is a computer-implemented method for matching a query from a user to at least one document in a database based on a sequence of topic words stored for each document in the database. This method includes the steps of accepting the query from a data input device; parsing the query to form query keywords which belong to a predetermined set of domain keywords; computing a closeness score between the parsed query and the topic words for each of a plurality of documents in the database; and sorting the computed closeness score of at least two of the plurality of documents in the database.

This invention has particular application to recognition of both character-based language script and letter-based romanized language script, including Chinese, Korean and Japanese as character-based language examples derived from Chinese characters, and English, French, Spanish, German and Russian as romanized language examples. In each language system, "words" are composed of strings of characters or strings of letters, for the fundamental units of the present invention.

A further understanding of the nature and advantages of the present invention may be realized by reference to the remaining portions of the specification and the drawings.

DESCRIPTION OF SPECIFIC EMBODIMENTS

I. Fundamental Hypotheses

Embodiments of the present invention rely on two fundamental hypotheses. The first fundamental hypothesis is that words that tend to appear together (e.g., in the same document) are semantically more closely related than words that do not. Thus, according to the present invention a statistical relationship is used between word pairs in the database, or document collection, D. In an embodiment of the invention, the statistical relationship is a measure of how likely two words appear together in a document in D.

The relationship between words may be expressed as an "associative word network." The associative word network is a directed graph-type object. Each node corresponds to a word that appears at least once in document collection, D. The edge connecting two nodes summarizes the statistical relationship between the corresponding word pair. This statistical relationship is used to replace the semantic relationships typically used in prior-art artificial intelligent systems, such as "A is a kind of B," and "C has an attribute D," and so on.

The second fundamental hypothesis is that the generality of the concept behind a word can be measured by how frequently the word appears in a document collection. Moreover, two words are either unrelated or the less-frequently-appearing word refines the concept defined by the more-frequently-appearing word.

II. Characterizing the Database

The indexing and retrieval engines according to embodiments of the present invention use various statistical characterizations of the database's search domain as a whole, in addition to information relating to individual documents within the database. These characterizations may be considered to be a part of the database index structure 107, depending on the particular implementation.

Figure 1:
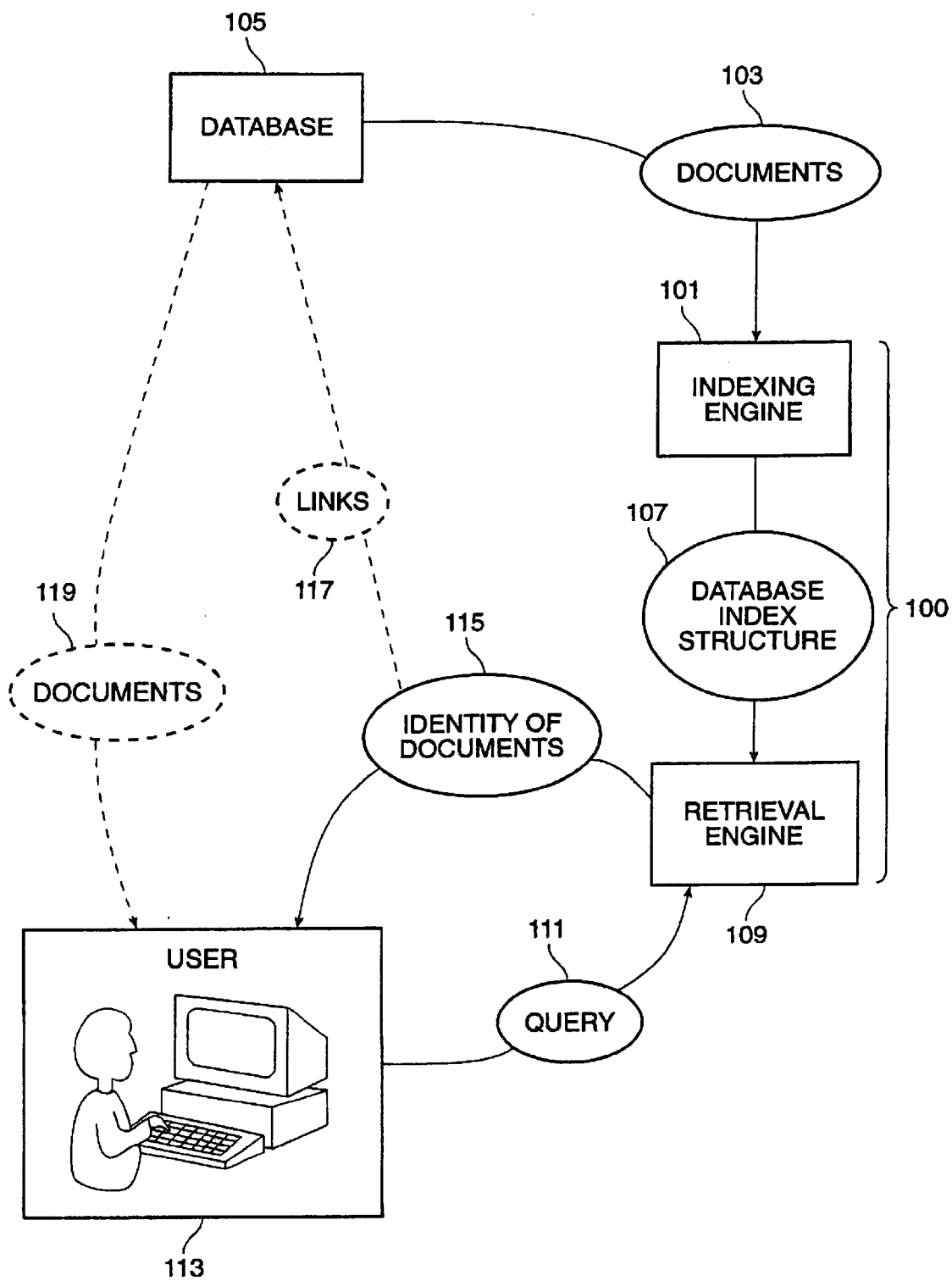
FIG. 1 shows a (prior-art) system and its environment for indexing and retrieving information from a database.
Figure 2:
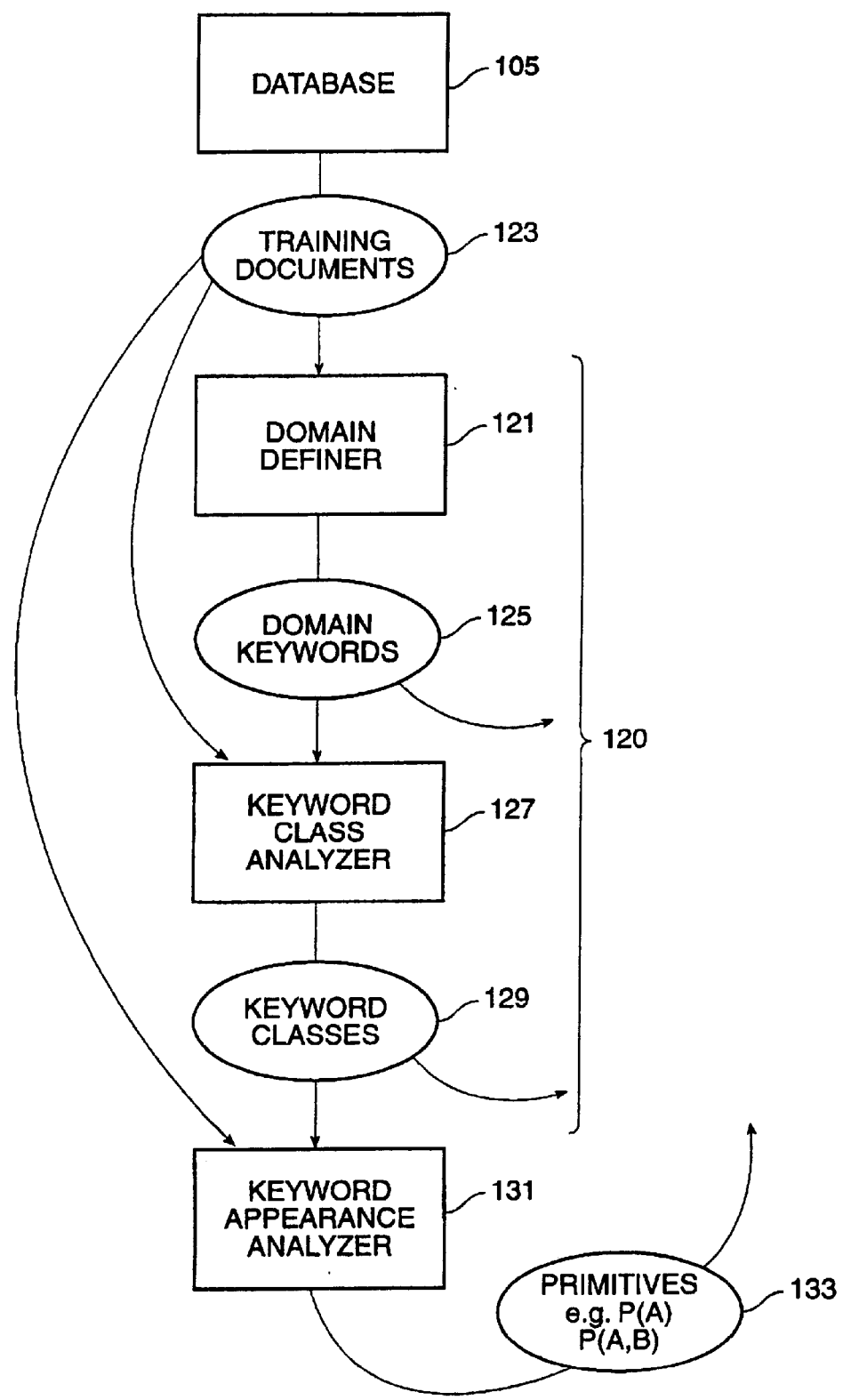
FIG. 2 shows a system and its environment for generating statistical characterizations of a database according to embodiments of the invention.

FIG. 2 shows a system 120 and its environment for generating statistical characterizations of a database 105 according to embodiments of the invention. A domain definer 121 receives training documents 123 from the database D 105 and generates from them domain keywords 125. A keyword class definer 127 creates keyword classes 129 for the domain keywords 125. A keyword appearance analyzer 131 generates various statistical information 133 which will be used as primitives in subsequent processing.

The domain definer 121, keyword class definer 127, and keyword appearance analyzer 131, like other modules in other figures, may be implemented as software residing in computer memory that directs a computer processor to perform computations. These and other modules may run on a same computer system, in a same session, or may be distributed across multiple computer systems, or be run at different times during different sessions.

The statistical characterizations 125, 127 and 133 may be organized or visualized as an associative word network, as defined above as a directed graph.

II.A. Domain Keywords

In an embodiment of the invention, the domain definer 123 discards stop words from the words found in the training documents 123. Any word that is a word in the resultant list is thereby defined to be a domain keyword 125. Thus the list provides a definition of domain keywords. Other definitions are possible. Each domain keyword 125 is a node in the associative word network.

In one example run, a set of 6,000 randomly selected text documents, each having at least 1,500 bytes and truncated beyond 20,000 bytes, was used to produce about 22,000 unique domain keywords.

II.B. Keyword Classes

Based on the above two hypotheses, the keyword class definer 127 divides the words in the associative word network into c classes, $C_1, C_2, \ldots, C_c$, according to their frequency of appearance in the training data, which is also taken to be their expected frequency of appearance in an information domain of which the training data is representative. The class $C_1$ contains the most common words, and the class $C_c$ contains the most infrequently appearing words. Ideally, any word in a class should appear no more frequently than any word in an immediately preceding class. Therefore, each domain keyword is expected to appear substantially no more frequently in an information domain than any arbitrary word in an immediately preceding keyword class.

A class $C_i$ is a preceding class of a class $C_j$ if i is less than j. $C_i$ is an immediately preceding class of $C_j$ if j=i+1. Similarly, a class $C_i$ is a succeeding class of a class $C_j$ if j<i, and $C_i$ is an immediately succeeding class of $C_j$ if i=j+1.

The class definer 127 balances the words in different classes, e.g., by choosing the classes to satisfy the following property:

$$\sum_{w \in C_i} P(w) \approx \sum_{w \in C_j} P(w)$$

where P(w) denotes the probability that the word w appears in a randomly selected document. An embodiment of the invention, given a particular randomly-selected training set of documents, replaces the above property with the property:

$$\sum_{w \in C_i} f(w) \approx \sum_{w \in C_j} f(w)$$

where f(w) denotes number of documents in the training set that contain the word w.

As is described below, defining classes for the domain keywords makes possible substantial computational and storage savings. In general, defining fewer classes produces greater savings. However, defining more classes in general produces more accurate results. Improved performance has been achieved by setting the number c of classes to a number that is at least about ten, with still further improved performance achieved by setting c to twenty, and to thirty, and to fifty. The amount of improvement is limited in practice by the amount of storage and computational resources available for satisfying the increased requirements of increased values of the number c. The optimum value for c may differ depending on the particular application and the available resources.

II.C. Database Statistics

Denote the word set in the document collection D by W and assume it has N words in it. Associate any word $w_i$ in W with a binary random variable $\overline{W}_i$. (Random variables will be represented by overlined characters and their values will be represented by capital letters. The word associated with a random variable will be the letter representing the random variable written in lower case.) $\overline{W}_i$ is equal to the value "presence" if $w_i$ appears in a randomly selected document from D, otherwise, it is equal to the value "absence". The probability $P(\overline{W}_i=\text{presence})$ is a measure of commonness of the meaning of the word $w_i$.

In the associative word network, there is a class condition governing when two nodes are connected, namely: there is a directed arc from the node corresponding to $w_i$ to the node corresponding to $w_j$ only if $w_i$ belongs to class k and $w_j$ belongs to class k+1. Thus, the associative word network is a directed acyclic graph.

In an embodiment of the invention, the closeness of the relation between two words $w_i$ and $w_j$ is measured by their mutual information, consistent with the second fundamental hypothesis.

Definition 1: The mutual information of two random variables $\overline{W}_i$ and $\overline{W}_j$ is defined as:

$$I(\overline{W}_i; \overline{W}_j) = \sum_{W_i, W_j} P(W_i, W_j) \log \frac{P(W_i, W_j)}{P(W_i)P(W_j)}$$

where the summation is over all the possible states; in this case of the states presence and absence. Note that herein log is the log of base 2; nevertheless, logarithms to other bases can be used in specific embodiments.

In the associative word network, a directed arc between two nodes is assigned a weight equal to the mutual information of the corresponding words. Notice that by means of the class condition stated above, the associative word network is not densely connected. To trim the connection further, an embodiment of the present invention uses a satiable threshold θ to remove all edges with weights less than θ.

Notice that the probability distribution of any word can be determined by counting the word's appearances in D. In practice, a random sample of D is chosen as the training set 123 and the statistics are computed based on the training corpus according to standard statistical estimation techniques.

A measure of the relationship among k words $(w_1, \ldots, w_k)$ is the joint probability distribution, $P(\overline{W}_1, \overline{W}_2, \ldots, \overline{W}_k)$. In a given document collection, the joint probability distribution can be obtained by simply counting the word co-occurrences. The number of these co-occurrences divided by the total number of documents in the collection yield the corresponding probabilities. This method is simple, but the computation is very huge when k is large since the number of possible states of k words is $2^k$. Even if one is interested only in the relation between two words, i.e., k=2, this computation is still infeasible for large collections.

Fortunately, each word is typically closely related with only a small number of other words. It is thus possible to approximate the high dimensional joint distribution by products of several lower dimensional joint distributions, as is discussed in detail below.

Thus, the keyword appearance analyzer 131 needs generate only a reduced subset of all possible distributions. As is discussed below, in a particular embodiment of the invention, an indexing procedure requires only the distributions $P(\overline{W}_i)$ and $P(\overline{W}_j, \overline{W}_k)$, and a retrieval procedure requires only the distributions $P(\overline{W}_i)$ and $P(\overline{W}_j|\overline{W}_k)$, for all domain keywords $w_i$ and all pairwise combinations of domain keywords $w_j$ and $w_k$ wherein $w_j$ belongs to a class that immediately succeeds $w_k$'s class (i.e., $w_k$ belongs to class a−1 and $W_j$ belongs to class a). In such an embodiment, the keyword appearance analyzer 131 needs only generate either the distributions $P(\overline{W}_i)$ and $P(\overline{W}_j, \overline{W}_k)$ or the distributions $P(\overline{W}_i)$ and $P(\overline{W}_j|\overline{W}_k)$, because either set of distributions is sufficient for computing the other set, according to:

$$P(w_j \mid w_k) = \frac{P(w_j, w_k)}{P(w_k)}$$

Because response speed is generally more important in the retrieval task than in the indexing task, the keyword appearance analyzer 131 in a specific embodiment of the invention computes the distributions $P(\overline{W}_i)$ and $P(\overline{W}_j|\overline{W}_k)$ to minimize required computations during the indexing task.

In partial summary, the database characterizer, or domain characterizer, according to an embodiment of the present invention uses the following steps to produce an associative word network:

1. accept c as a system parameter;
2. accept a training set of documents;
3. establish the definition of domain keywords, e.g., by discarding non-stop words;
4. count appearances for all domain keywords in the training set to estimate the distribution $P(\overline{W}_i)$, described above, and sort the domain keywords by, e.g., the number of documents in which they appear;
5. assign all domain keywords to one of c classes in a manner that balances the classes;
6. viewing each domain keyword as a node in a directed acyclic graph, create a directed edge from each node to the nodes in an immediately succeeding class;
7. establish the weight for each edge, e.g., by counting its nodes' ($w_j$'s and $w_k$'s) co-occurrence frequencies to estimate the distribution $P(\overline{W}_j, \overline{W}_k)$ and by computing the mutual information between connected nodes as the edge weight;
8. optionally, eliminate edges whose weights are too low.

III. Indexing

III.A. Topic Thread

An important function of embodiments of the invention is to automatically determine a sequence of keywords, i.e., the topic words, that can best describe a document. Such a sequence can be called the topic thread.

In a topic thread there should be some common keywords to indicate to which general topic the document belongs—keywords such as, "computer", "country", "economy", etc. There should also be some uncommon keywords to indicate the specific nature of the document (assume it has one). A definition of topic thread that includes both common and uncommon keywords according to embodiments of the present invention is as follows.

Definition 2: A topic thread is defined as a word vector, $$(w_1, w_2, \ldots, w_c)$$

where $$w_i \epsilon C_i, 1 \leq i \leq c.$$

For example, the word vector (percent, market, company, investment, price, limited, ford, auto, auto-maker, vehicle) is a topic thread in an implementation where c=10.

For a topic thread $t=(w_1, \ldots, w_c)$, one can associate a random variable, $\overline{T}$, with a probability function, $P(T)=P(\overline{T}=T)$:

$$P(T) = P(W_1, W_2, \ldots, W_c)$$
$$= P(W_c \mid W_{c-1}, \ldots, W_1) \ldots P(W_2 \mid W_1)P(W_1)$$

To compute the probability, the following conditional independence property is assumed:

$$P(W_i|W_{i-1}, \ldots, W_1) = P(W_i|W_{i-1})$$

For example, $$P(\overline{investment}=X|\overline{company}=Y, \overline{market}=Z) = P(\overline{investment}=X|\overline{company}=Y)$$

Under this assumption, $$P(T) = P(W_1, W_2, \ldots, W_c)$$
$$= P(W_c \mid W_{c-1})P(W_{c-1} \mid W_{c-2}) \ldots P(W_2 \mid W_1)P(W_1)$$

For subsequent discussions, the following conditional independence property is also assumed:

$$P(U_1, U_2, \ldots, U_k|V) = P(U_1|V)P(U_2|V) \ldots P(U_k|V)$$

where $U_i$'s belong to class a and V belongs to class a−1.

III.B. Representative Topic Thread

Different word groupings in a given document can generate many topic threads. Some of them are meaningful, and others are not. Some are relevant to the document, and others are not. In embodiments of the invention, the most relevant topic thread is used to represent a document. The topic thread, not the whole document, is saved in the index structure and is used for the document retrieval process.

To determine the most relevant topic thread, the following procedure is used. View a document d as a set of words ($w_1, w_2, \ldots, w_n$). That is, the issue of word multiplicity and word ordering are ignored. These words are grouped according to the associative word network into a set vector ($d_1, d_2, \ldots, d_c$), where $d_i = (d_{i,1}, \ldots, d_{i,ni})$, $1 \leq i \leq c$, contains all the domain keywords in the document that belong to class $C_i$. Consider the corresponding random variable: $\overline{D} = (\overline{D}_1, \ldots, \overline{D}_c)$, where $\overline{D}_i$ is the vector of random variables associated with class $C_i$ words. The distribution $P(D) = P(\overline{D} = D)$ is a key characteristic of the document.

By applying the conditional independence assumptions, one obtains:

$$P(D) = P(D_1, D_2, \ldots D_c)$$
$$= P(D_c | D_{c-1}) \ldots P(D_2 | D_1) P(D_1)$$
$$= \prod_{w \in d_c} P(W | D_{c-1}) \ldots \prod_{w \in d_2} P(W | D_1) \prod_{w \in d_1} P(W)$$
$$\vdots$$

Let $k = (k_1, \ldots, k_c)$ be a topic thread. Consider the corresponding random variable, $\overline{K} = (K_1, \ldots, K_c)$. Since the words in the topic thread come from the document, without loss of generality, one can assume:

$$k_i = d_{i,j}$$

for some j. Put another way, $k_i$ is a domain keyword $d_{i,j}$ found in the document, and we can associate $K_i$ with $D_{i,j}$. Hence, the event, $\{\overline{K}_i = K_i\}$ is identical to the event $\{\overline{D}_{i,j} = D_{i,j}\}$.

One can construct an approximation to the probability by:

$$P_k(D) = P(D_c | K_{c-1}) \ldots P(D_2 | K_1) P(D_1)$$
$$= \prod_{w \in d_c} P(W | K_{c-1}) \ldots \prod_{w \in d_2} P(W | K_1) \prod_{w \in d_1} P(W)$$

To measure how accurate this approximation is, the concept of cross-entropy is used. That is, define:

$$CE(P(\overline{D}), P_k(\overline{D})) = \sum_D P(D) \log \frac{P(D)}{P_k(D)}$$

where the summation is taken over all possible states of the word random variables in the document.

For a given document, d, its representative topic thread is chosen to be the topic thread with its component words in d that minimizes the cross-entropy $CE(P(\overline{D}), P_k(\overline{D}))$.

To minimize the cross-entropy efficiently, the following result is used:

Proposition 1: Consider a topic thread $k = (k_1, \ldots, k_c)$. The cross-entropy $CE(P(\overline{D}), P_k(\overline{D}))$ is minimized if for each keyword $k_i$, $1 \leq i \leq c-1$, the following mutual information is maximized:

$$\sum_{w \in d_{i+1}} I(\overline{W}; \overline{K}_i)$$

Thus, the cross-entropy is a cost function that can be minimized by maximizing an alternate metric (e.g., the quantity above) in a computationally simpler manner. Note that, merely by playing with terminology, minimizing a cost function can be characterized as maximizing a utility function, if the utility function is simply defined as the opposite of the cost function (e.g., as its negative or inverse), even though the two operations are clearly equivalent.

Similarly, maximizing the alternate metric is equivalent to minimizing an oppositely-defined alternate metric. However, minimizing the above-discussed cost function (cross-entropy) by maximizing the above-discussed alternate metric (summed mutual information) goes beyond mere terminology shuffling because the alternate metric is actually computationally simpler to maximize than the original cost function is to minimize.

The indexing procedure in an embodiment of the invention is as follows:

1. For the given document d, group the document keywords in d into $d_1, d_2, \ldots, d_c$, according to the classes in the associative word network.

2. For each class $d_i$, $1 \leq i \leq c-1$, of document keywords, find a word $k_i$ that satisfies Proposition 1 as the word element of the representative topic thread.

3. The keyword $k_c$, which maximizes $I(K_c; K_{c-1})$ is appended to the representative topic thread.

The number of domain keywords in the representative topic thread is c, which is a fixed, small number, so that the storage memory for the indexing database is substantially smaller than a full-text retrieval database.

Typically, if c is chosen to be small in comparison to the general number of unique document keywords in each document in a database, most documents in the database will have document keywords belonging to every class, and therefore most documents in the database will have exactly c topic words in its topic thread.

As shown by the above-provided definition for mutual information, the distributions needed in the indexing procedure are $P(\overline{W}_i)$ and $P(\overline{W}_j, \overline{W}_k)$ (which can be computed from $P(\overline{W}_i)$ and $P(\overline{W}_j | \overline{W}_k)$), for all domain keywords $w_i$ and all pairwise combinations of domain keywords $w_j$ and $w_k$ wherein $w_j$ belongs to a class that immediately succeeds $w_k$'s class (i.e., k=j-1)

Figure 3:
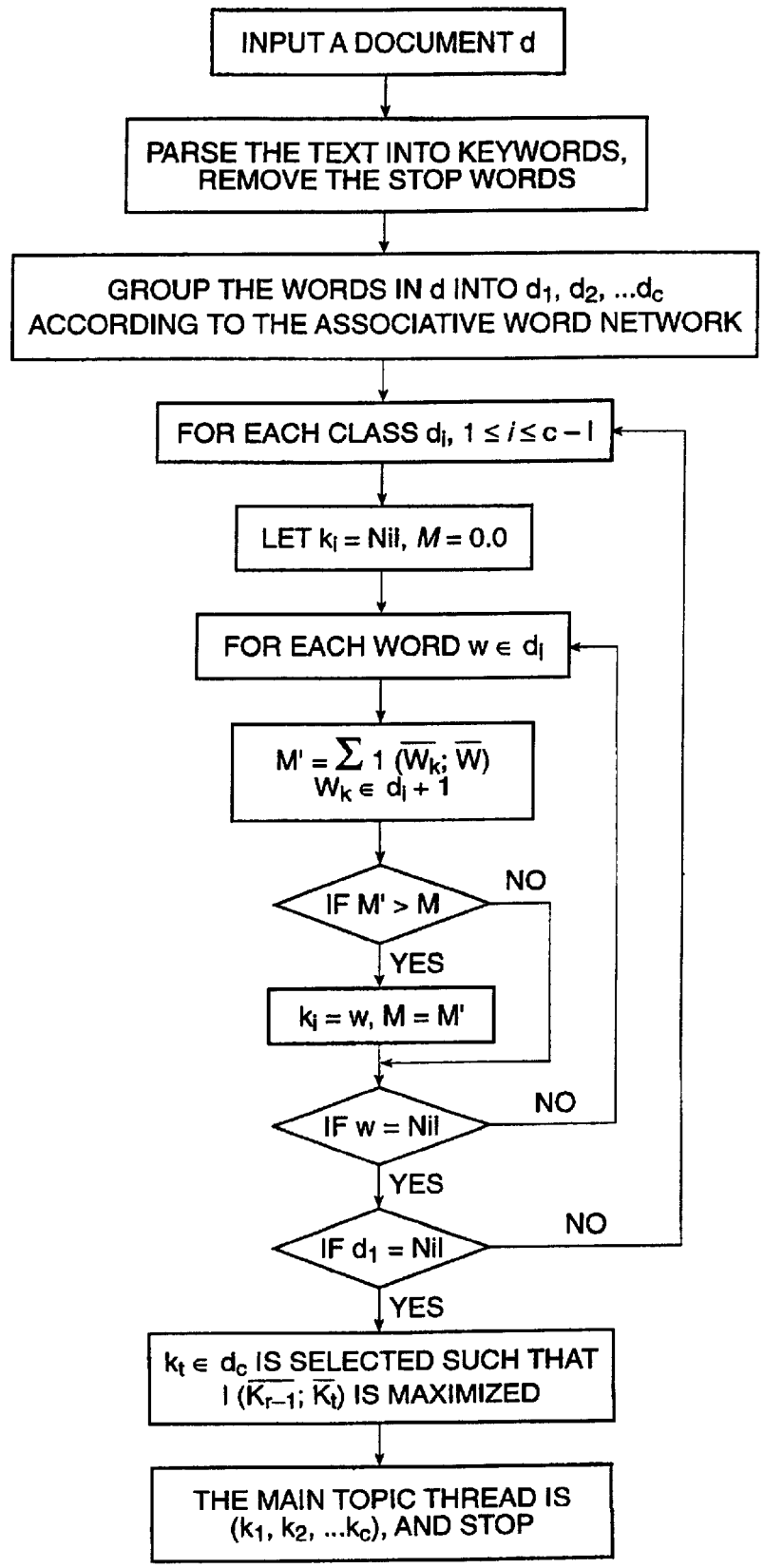
FIG. 3 is a flowchart that illustrates an implementation of the indexing procedure.

FIG. 3 is a self-explanatory flowchart that illustrates an implementation of the indexing procedure.

Figure 4:
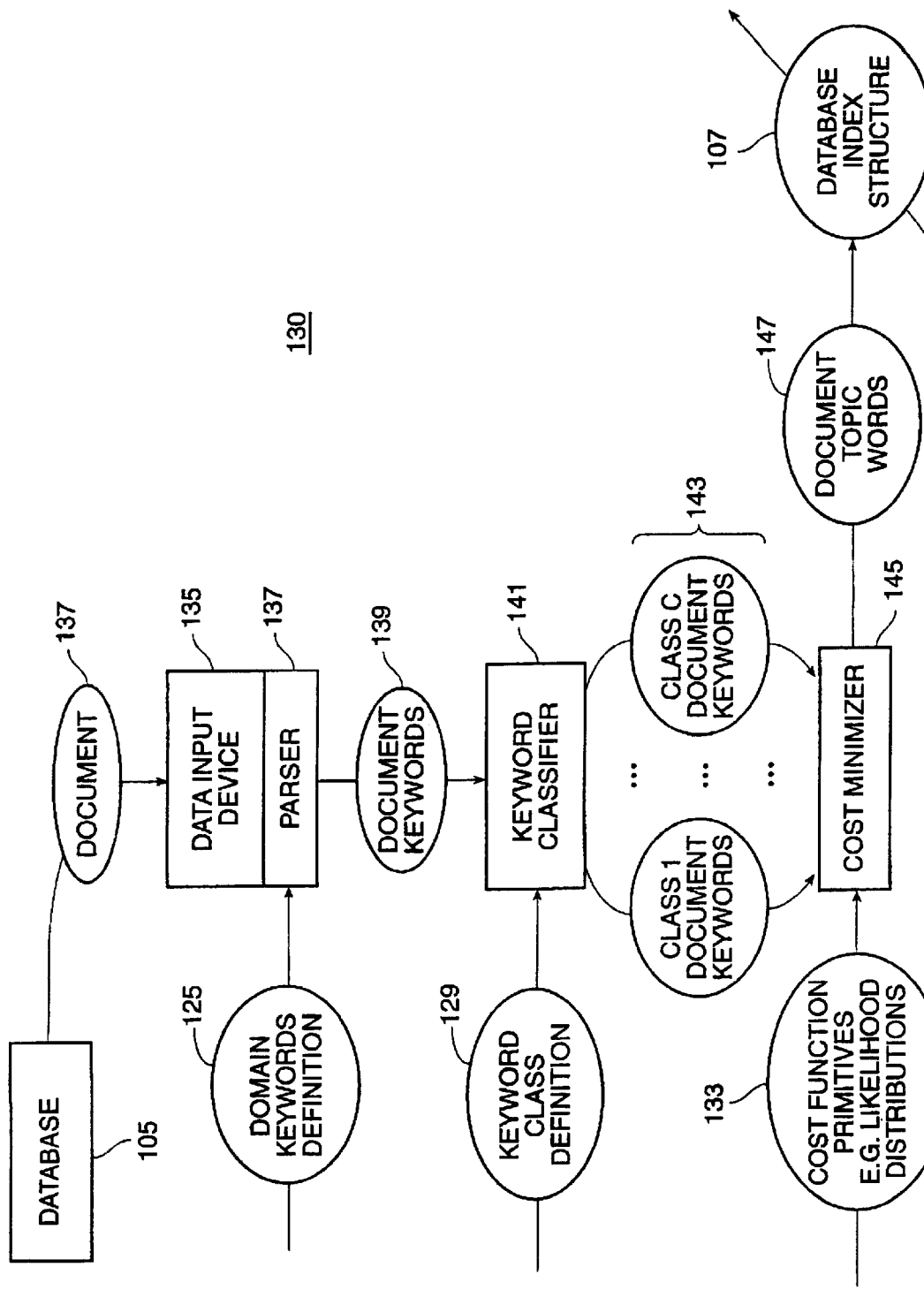
FIG. 4 is a block diagram that illustrates a document indexing system that implements the indexing procedure.

FIG. 4 is a block diagram that illustrates a document indexing system 130, and its environment, that implements the indexing procedure. FIG. 4 would also apply to systems implementing other similar indexing procedures according to the present invention.

In FIG. 4, a data input device 135 accepts a document 137 to be indexed. The data input device 135 may be a keyboard, microphone, scanner, facsimile device, wireless receiver, modem, or another device, either connected to a local computer or connected to a remote computing device, but is not limited to such devices. The data input device 135 may also be a network interface device that accepts input from remote machines via a network such as a local area network, a wide area network, the Internet, or any other network, using electrical, optical, electromagnetic, or other type of communication technology.

A parser 137 extracts document keywords 139 from the document 137 for use in indexing. In a specific embodiment of the invention, the document keywords are words appearing in the document that are domain keywords, according to a definition 125 of domain keywords. The definition 125 is simply the global list of domain keywords in the specific embodiment.

A keyword classifier 141 generates sets 143 of keywords, each set corresponding to a keyword class based on a definition 129 of keyword classes. In a specific embodiment of the invention, the definition 129 of keyword classes is simply the list of global domain keywords, segregated into their classes, in the form, e.g., of the associative word network.

A cost minimizer 145 performs computations on the sets, or classes, 143 of document keywords, using cost function primitives 133 to minimize a cost function to select the document topic words 147, organized as a thread, for inclusion in the database index structure 107.

IV. Retrieval

Figure 5:
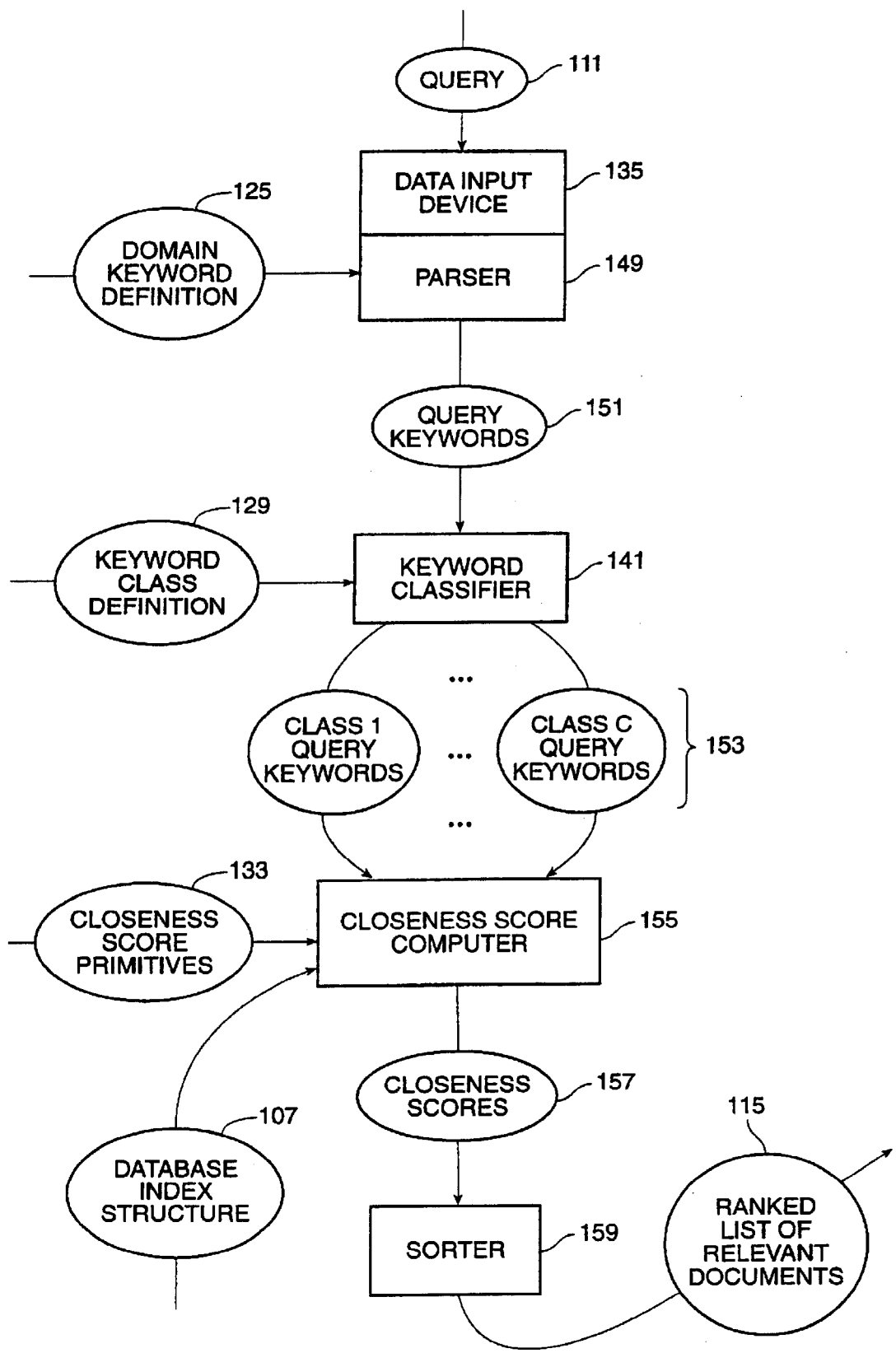
FIG. 5 shows a document retrieval system according to embodiments of the present invention.

Retrieval is the process to locate a group of documents that satisfy the user's information need. FIG. 5 shows a document retrieval system 140, and its environment, according to embodiments of the present invention. Usually, the user's information need 111 is represented as a list of query keywords, or a parser 149 determines a suitable list of query keywords q 151 corresponding to the query 111.

Unlike traditional approaches, embodiments of this invention do not search over all the documents in the document collection for exact matches directly. Instead, all documents are represented by their topic threads and the system aims to maximize the conditional probability $P(\overline{Q}=\text{``presence''}|\overline{K}=\text{``presence''})$, where $k=(k_1, \ldots, k_c)$ is the topic thread of a document. This conditional probability is also written as $P(\overline{Q}=1|\overline{K}=1)$ for compactness.

To make the computation of this conditional probability more efficient, a keyword classifier 141 first generates groupings of the words in q 151 into $(q_1, q_2, \ldots, q_c)$ 153, e.g., by applying the associative word network. By means of the conditional independence property:

$$P(\overline{Q}=1|\overline{K}=1) = \frac{P(\overline{Q}=1, \overline{K}=1)}{P(\overline{K}=1)}$$

$$= \frac{P(\overline{Q_c}=1, \overline{K_c}=1|\overline{Q_{c-1}}=1, \overline{K_{c-1}}=1)\ldots P(\overline{Q_2}=1, \overline{K_2}=1|\overline{Q_1}=1, \overline{K_1}=1)P(\overline{Q_1}=1, \overline{K_1}=1)}{P(\overline{K_c}=1|\overline{K_{c-1}}=1)\ldots P(\overline{K_2}=1|\overline{K_1}=1)P(\overline{K_1}=1)}$$

The numerator can be approximated using:

$$P(Q_i, K_i | Q_{i-1}, K_{i-1}) = P(K_i | Q_{i-1}, K_{i-1}) \prod_{w \in q_i} P(W | Q_{i-1}, K_{i-1})$$

for $2 \leq i \leq c$, and $$P(Q_1, K_1) = P(K_1) \prod_{w \in q_i} P(W)$$

To compute the terms $P(W|Q_j, K_j)$ in the above formula, the well known Noisy OR assumption in Bayesian Network is used [Jensen, 1996]. Namely:

$$P(U|V_1, V_2) = 1 - P(-U|V_1)P(-U|V_2)$$

where −U represents the complement of U.

A closeness score computer 155 computes the conditional probabilities 157 for all the topic threads in the database index structure 107. A sorter 159 sorts the computed scores in decreasing order. Identities of the top M documents 115 (or the documents themselves) are presented to the user. (M is a pre-determined, e.g., user-specified, system parameter.)

Figure 6:
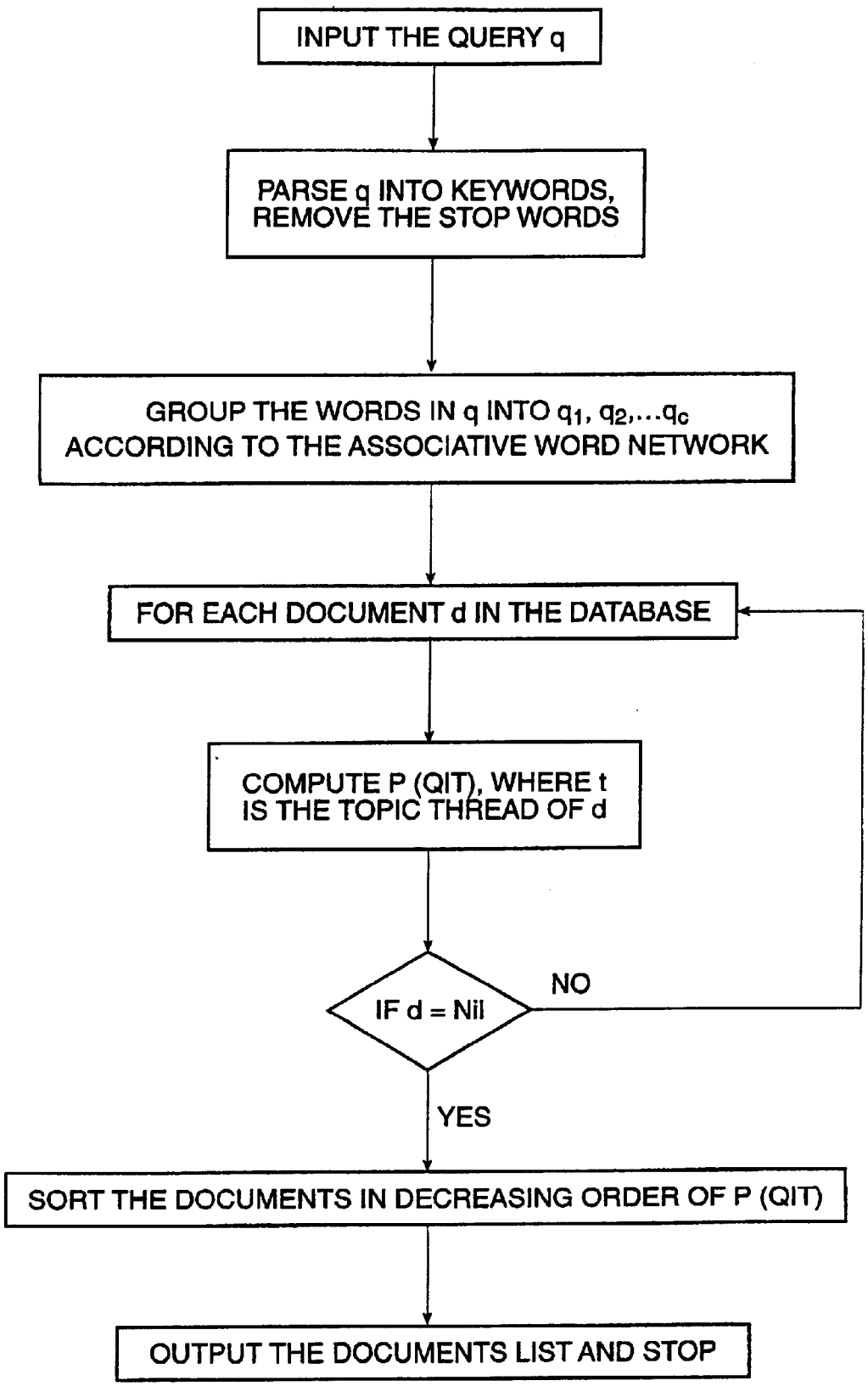
FIG. 6 is a flowchart that illustrates an implementation of the retrieval procedure.

FIG. 6 is a self-explanatory flowchart that illustrates an implementation of the retrieval procedure.

Upon analysis of the retrieval procedure, it is seen that the distributions needed are $P(\overline{W_i})$ and $P(\overline{W_j}|\overline{W_k})$ (which can be computed from $P(\overline{W_i})$ and $P(\overline{W_j}|\overline{W_k})$), for all domain keywords $w_i$ and all pairwise combinations of domain keywords $w_j$ and $w_k$ wherein $w_j$ belongs to a class that immediately succeeds $w_k$'s class (i.e., k=j−1).

V. An Example of Topic Thread Determination

Consider a document with the words:

$$\{w_1, w_2, w_3, w_4, w_5, w_6\}$$

Words $w_1$, and $w_2$ belong to a Class 8; words $w_3$ and $w_4$ belong to a Class 9; words $w_5$ and $w_6$ belong to a Class 10.

V.A. The Steps of Computation

To determine the topic thread for this document, perform the following steps:

1. Compute:

$$I(\overline{W_1}, \tilde{W_3}) + I(\overline{W_1}, \tilde{W_4})$$

Call this value a. (See the section below to see how to compute $I(W_1, W_3)$) Similarly, compute:

$$I(\overline{W_2}, \tilde{W_3}) + I(\overline{W_2}, \tilde{W_4}) = b$$

Suppose a is larger than b; declare $k_8 = w_1$.

2. Compute:

$$I(\overline{W_3}, \tilde{W_5}) + I(\overline{W_3}, \tilde{W_6}) = c$$

$$I(\overline{W_4}, \tilde{W_5}) + I(\overline{W_4}, \tilde{W_6}) = d$$

Suppose d is larger than c; declare $k_9 = w_4$.

3. Compute:

$$I(\overline{W_4}, \tilde{W_5}) = e$$

$$I(\overline{W_4}, \tilde{W_6}) = f$$

Suppose f is larger than e; declare $k_{10} = w_6$.

The topic is therefore:

$$\{\text{null, null, null, null, null, null, null, } w_1, W_4, W_6\}$$

V.B. How to Compute $I(W_1, W_3)$

Let:

$$p(\overline{W_1}=1, \overline{W_3}=1) = p_1$$

-continued $p(\overline{W_1} = 1, \overline{W_3} = 0) = p_2$ $p(\overline{W_1} = 0, \overline{W_3} = 1) = p_3$ $p(\overline{W_1} = 0, \overline{W_3} = 0) = p_4$ Note that:

$p(\overline{W_1} = 1) = p(\overline{W_1} = 1, \overline{W_3} = 1) + p(\overline{W_1} = 1, \overline{W_3} = 0) = p_1 + p_2$ $p(\overline{W_1} = 0) = p(\overline{W_1} = 0, \overline{W_3} = 1) + p(\overline{W_1} = 0, \overline{W_3} = 0) = p_3 + p_4$ $p(\overline{W_3} = 1) = p(\overline{W_1} = 1, \overline{W_3} = 1) + p(\overline{W_1} = 0, \overline{W_3} = 1) = p_1 + p_3$ $p(\overline{W_3} = 0) = p(\overline{W_1} = 1, \overline{W_3} = 0) + p(\overline{W_1} = 0, \overline{W_3} = 0) = p_2 + p_4$ Then, $$I(\overline{W_1}, \overline{W_3}) = p_1 \log \frac{p_1}{(p_1+p_2)(p_1+p_3)} + p_2 \log \frac{p_2}{(p_1+p_2)(p_2+p_4)} +$$
$$p_3 \log \frac{p_3}{(p_3+p_4)(p_1+p_3)} + p_4 \log \frac{p_4}{(p_3+p_4)(p_2+p_4)}$$

Other mutual information terms can be computed similarly.

VI. An Example for a Query Score Computation

Consider a query:

With $w_6$ in Class 10, $w_7$ in Class 9 and $w_8$ in Class 8.

$q = (w_6, w_7, w_8)$

To compute the score of document d with respect to query q, compute the following probability:

$$\frac{P(\overline{W_6} = 1, \overline{W_6} = 1 | \overline{W_7} = 1, \overline{W_4} = 1)}{P(\overline{W_7} = 1, \overline{W_4} = 1 | \overline{W_8} = 1, \overline{W_1} = 1) P(\overline{W_8} = 1, \overline{W_1} = 1)}$$
$$\overline{P(\overline{W_6} = 1 | \overline{W_4} = 1) P(\overline{W_4} = 1 | \overline{W_1} = 1) P(\overline{W_1} = 1)}$$

Note that:

$P(\overline{W_6} = 1, \overline{W_6} = 1 | \overline{W_7} = 1, \overline{W_4} = 1) = P(\overline{W_6} = 1 | \overline{W_7} = 1, \overline{W_4} = 1) \approx$ $1 - P(\overline{W_6} = 0 | \overline{W_7} = 1) P(\overline{W_6} = 0 | \overline{W_4} = 1)$ And:

$P(\overline{W_7} = 1, \overline{W_4} = 1 | \overline{W_8} = 1, \overline{W_1} = 1) \approx$ $P(\overline{W_7} = 1 | \overline{W_8} = 1, \overline{W_1} = 1) P(\overline{W_4} = 1 | \overline{W_8} = 1, \overline{W_1} = 1) \approx$ $(1 - P(\overline{W_7} = 0 | \overline{W_8} = 1, \overline{W_1} = 1))(1 - P(\overline{W_4} = 0 | \overline{W_8} = 1, \overline{W_1} = 1))$ While the above is a complete description of specific embodiments of the invention, various modifications, alternative constructions, and equivalents may be used. Therefore, the above description should not be taken as limiting the scope of the invention as defined by the claims.

What is claimed is:

1. In a computer, a method for establishing topic words to represent a document wherein the topic words are suitable for inclusion in a computer database index structure, the method comprising the steps of:

accepting at least a portion of the document from a data input device, wherein the portion of the document includes words;

determining a plurality of document keywords from the portion of the document;

classifying each of the document keywords into one of a plurality of preestablished keyword classes; and selecting words as the topic words, each said selected word from a different one of the preestablished keyword classes, to minimize an entropy-based cost function on proposed topic words.

2. The method according to claim 1 wherein the cost function is a metric of dissimilarity between a first statistical distribution of likelihood of appearance by the plurality of document keywords in a typical document and a second statistical distribution of likelihood of appearance by the plurality of document keywords in a typical document, the second statistical distribution being approximated using proposed topic words.

3. The method according to claim 2 wherein the metric of dissimilarity is cross-entropy.

4. The method according to claim 3 wherein the step of selecting words from the document keywords comprises minimizing or maximizing an alternate metric to thereby minimize the cross-entropy without actually computing cross-entropy.

5. The method according to claim 2 wherein the preestablished keyword classes are ordered such that at least one of the keyword classes has an immediately succeeding keyword class, and wherein the step of selecting words from the document keywords as the topic words comprises the steps of:

computing a sum of mutual information between appearance by a document keyword and appearance by each of the document keywords that belong to an immediately succeeding keyword class; and selecting a document keyword, from the plurality of document keywords belonging to a particular one of the keyword classes, that has the highest summed mutual information with respect to document keywords that belong to an immediately succeeding keyword class as the topic keyword from the particular keyword class.

6. The method according to claim 2 wherein:

the preestablished keyword classes are ordered such that at least one of the keyword classes has an immediately preceding keyword class from among the preestablished keyword classes;

the first statistical distribution of likelihood includes an assumption of conditional independence under which the likelihood of appearance of a keyword in any particular document depends only on the appearance or nonappearance of keywords from an immediately preceding keyword class in that particular document; and the second distribution of likelihood includes an approximation under which the likelihood of appearance of a keyword in any particular document depends only on the appearance or nonappearance of a proposed topic keyword from an immediately preceding keyword class in that particular document.

7. The method according to claim 1 wherein the keyword classes consist of less than about fifty keyword classes.

8. The method according to claim 1 wherein the keyword classes consist of less than about twenty keyword classes.

9. The method according to claim 1 wherein the preestablished keyword classes have an ordering of classes, and an arbitrary word in one of the preestablished keyword class is expected to appear substantially no more frequently in an information domain than any arbitrary word in an immediately preceding keyword class.

10. The method according to claim 1 wherein:

the step of determining the plurality of document keywords comprises determining as the document keywords only words which qualify as domain keywords according to a preestablished definition of domain keywords.

11. The method according to claim 10 wherein:

there exists a predetermined set of domain keywords found in the database;

the step of determining as the document keywords only words which qualify as domain keywords according to a preestablished definition of domain keywords comprises extracting words from the portion of the document that belong to the predetermined set of domain keywords; and the method further comprises, before the step of classifying each of the document keywords into one of the preestablished keyword classes, the step of partitioning the set of domain keywords into an ordered plurality of domain keyword groups wherein a word in an arbitrary one of the domain keyword groups is expected to appear in substantially no more documents in the database than any word in a lower-ordered domain keyword group, and wherein the ordered plurality of domain keyword groups forms the preestablished keyword classes.

12. The method according to claim 11 wherein the step of partitioning the set of domain keywords comprises the step of controlling relative numbers of domain keywords partitioned into each domain keyword group.

13. The method according to claim 12 wherein the step of controlling relative numbers of domain keywords comprises substantially equalizing, across all the domain keyword groups, a sum for each domain keyword group of the probability for each domain keyword in the each domain keyword group that a randomly selected document from the database includes the each domain keyword.

14. The method according to claim 11 wherein there exists a set of domain keyword training documents from an information domain, the method further comprising, before the step of determining a plurality of document keywords, the step of extracting non-stop words from the set of domain keyword training documents to thereby establish the set of domain keywords.

15. The method according to claim 1 further comprising a step of writing the topic keywords to a computer-readable memory product to form a computer-readable database index product of topic keywords for at least one document, wherein the database index product includes the computer-readable memory product.

16. A computer-readable database index product formed according to the method of claim 15.

17. In a computer, a method for establishing topic words to represent a document from a database, the document including words, the topic words to be used by a computer-based document retrieval engine having a user interface, the method comprising the steps of:

extracting a subset of the words as nonrepeating document keywords;

grouping the document keywords into ordered groups $d_1$ to $d_c$, wherein each group uniquely corresponds to one of a plurality of preestablished keyword classes numbered from 1 to a number c from most common to least common in the database;

identifying, for each of the c−1 most common groups $d_1$ to $d_{c-1}$, a document keyword $k_i$ that has greatest summed mutual information $$\sum_{w_j \in d_{i+1}} I(\overline{W}_j; \overline{K}_i)$$

wherein i is the number of the each group, $\overline{K}_i$ is a random variable corresponding to appearance or nonappearance of the keyword $k_i$ in a typical document, and $\overline{W}_j$ is a random variable corresponding to appearance or nonappearance of a word $w_j$ in a typical document; and identifying, for the least common group c, a document keyword $k_c$ that has greatest mutual information $I(\overline{K}_{c-1}; \overline{K}_c)$, wherein the document keywords $k_1, \ldots, k_c$ are the topic words.

18. The method according to claim 17 wherein mutual information for any two random variables $\overline{W}_i, \overline{W}_j$ is defined as:

$$I(\overline{W}_i; \overline{W}_j) = \sum_{W_i, W_j} P(W_i, W_j) \log \frac{P(W_i, W_j)}{P(W_i)P(W_j)}.$$

19. A computer-implemented method for matching a query from a user to at least one document in a database based on a sequence of topic words stored for each document in the database, the method comprising the steps of:

accepting the query from a data input device;

parsing the query to form query keywords which satisfy a predetermined definition of domain keywords;

computing a closeness score between the parsed query and the topic words for each of a plurality of documents in the database using an entropy-based metric; and sorting the computed closeness score of at least two of the plurality of documents in the database.

20. The method according to claim 19 wherein the step of computing a closeness score comprises the steps of:

classifying each of the query keywords into one of a plurality of preestablished keyword classes; and computing as the closeness score a conditional likelihood of appearance by the query keywords given appearance by the topic words of one of the plurality of documents in the database.

21. The method according to claim 20 wherein the database is the Internet and the method further comprises:

providing links to a user to documents in the database which have a closeness score above a selectable threshold value.

22. A system for establishing topic words for characterizing a document comprising:

a parser for determining a plurality of document keywords from the document;

a keyword classifier for generating groupings of the document keywords according to predefined classes; and an entropy-based cost function minimizer for minimizing a cost function on potential topic words and establishing a lowest-cost set of potential topic words as the topic words for the document.

23. A system for matching a query from a user to at least one document in a database based on a plurality of topic words stored in an index structure for each document in the database, the system comprising:

a parser for parsing the query to form query keywords which satisfy a predetermined definition of domain keywords;

a closeness score computer for computing a closeness score between the parsed query and the topic words for each of a plurality of documents in the database using an entropy based metric, wherein the closeness score computer uses the same number of topic words for each of the plurality of documents in the database; and a sorter for sorting the computed closeness score of at least two of the plurality of documents in the database.

* * * * *